United States Patent

[11] 3,554,488

| [72] | Inventor | William H. Alexander |
| | | Houston, Tex. |
| [21] | Appl. No. | 753,664 |
| [22] | Filed | Aug. 19, 1968 |
| [45] | Patented | Jan. 12, 1971 |
| [73] | Assignee | Tex.team Corporation |
| | | Houston, Tex. |
| | | a corporation of Texas |

[54] PLUG VALVE
15 Claims, 6 Drawing Figs.

[52] U.S. Cl. ........................................... 251/317
[51] Int. Cl. ........................................... F16k 5/02
[50] Field of Search .......................... 251/314, 317, 288, 316, 359, 174; 137/375

[56] References Cited
UNITED STATES PATENTS

| 2,994,504 | 8/1961 | Reed | 251/317 |
| 3,108,779 | 10/1963 | Anderson | 251/309 |
| 867,780 | 10/1907 | Auchu | 137/375 |
| 950,382 | 2/1910 | Farnan | 251/288 |
| 2,157,526 | 5/1939 | Chaney et al. | 251/359X |
| 2,373,925 | 4/1945 | Townhill | 251/174X |
| 3,066,909 | 12/1962 | Reed | 251/317X |
| 3,206,163 | 9/1965 | Freed | 251/317X |
| 3,216,698 | 11/1965 | Bouchard et al. | 251/317 |

FOREIGN PATENTS

| 522,228 | 3/1931 | Germany | 251/314 |

Primary Examiner—M. Cary Nelson
Assistant Examiner—R. B. Rothman
Attorney—Norman Aon Witt ABSTRACT: Plug valve including a cylindrical cavity with ports and elastomeric seats within the cavity at the ports defining a tapered opening for receiving a tapered plug.

INVENTOR
WILLIAM H. ALEXANDER
BY
ATTORNEY

PLUG VALVE

This invention relates in general to a plug valve, and more particularly to a plug valve employing elastomeric seats for bubble-tight seal which can be economically fabricated and assembled.

The valve of the present invention includes a body of metal that may be easily machined, while at the same time requiring a minimum of machining to prepare it for assembly. Molded or otherwise constructed elastomeric seats coact with the ports in the body and have interposed therebetween a tapered plug with a diametrically extending flow passage therethrough. The plug is cast metal or otherwise constructed and is provided with a stem integrally formed therewith, all of which can be machined together. The seats are constructed to be supported in position within the body and held in position by the plug, the latter of which is in turn locked in the body by a cover member having an opening therein allowing the stem to protrude exteriorly. The valve, while applicable for pressures in the magnitude of around 175 P.S.I. and lower, may also be employed for higher pressures. Preferably, the seats are made of a nitrile compound, wherein the part that seals against the body is of a greater hardness than the part that seals against the plug. Rigidity and strength are built into the seats by the configuration and/or material.

Accordingly, it is an object of the present invention to provide a new and improved low pressure plug valve employing an elastomeric type seat capable of obtaining a bubble-tight seal, wherein the valve may be economically fabricated and assembled.

Another object of this invention is the provision of an elastomeric seat for use in plug valves that is capable of providing an efficient sealing relationship with the parts engaged thereby.

Other objects, features and advantages of the invention will be apparent from the following detailed disclosure, taken in conjunction with the accompanying sheets of drawings, wherein like reference numerals refer to like parts, in which.

Figure 1:
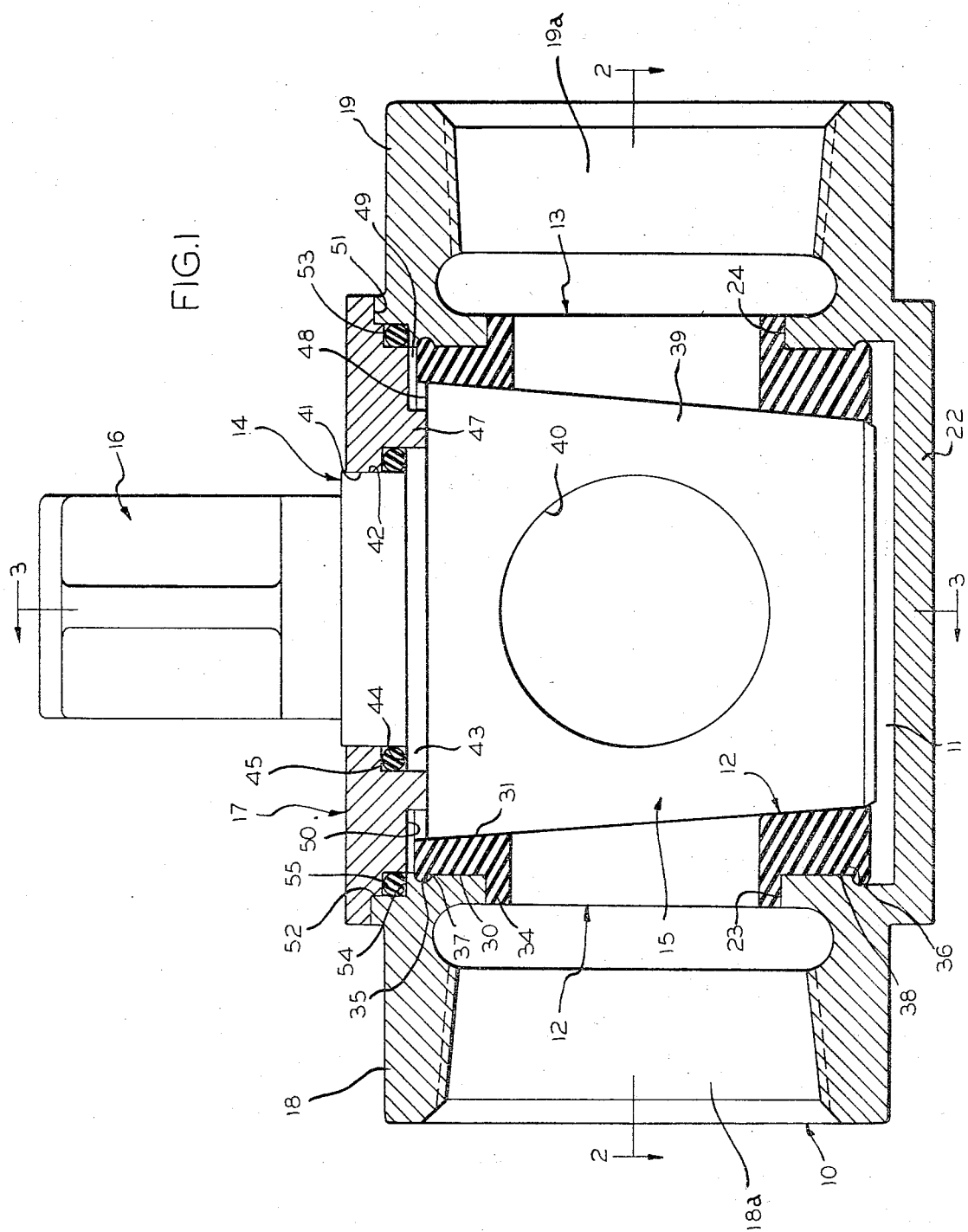
FIG. 1 is a vertical sectional view taken through the valve according to the present invention and illustrating the plug in elevation with certain details omitted for purposes of clarity.

Referring now to the drawings, the plug valve of the present invention includes generally a body or body core 10 having a cavity 11, elastomeric seats 12 and 13 arranged within the cavity 11, a combination plug and stem 14 including a plug 15 and a stem 16, and a cover member 17.

The body 10 includes diametrically opposed hubs 18 and 19 that have openings 18a and 19a extending therethrough in communication with the cavity 11, and either of which may be the inlet or outlet for the valve. The hubs as shown are especially suitable for connection with threaded pipe, but it should be appreciated that flanged ends could be provided in their place. In this respect, the hubs generally serve as pipe or conduit connecting portions at the inlet and outlet or valve ends. The cavity is defined by a generally cylindrical wall 20 having an inner cylindrical face 21, and is closed at its bottom end of a bottom wall 22 while being open at its upper or bonnet end. The upper end of the cavity is closed by the cover member 17. Cylindrical openings or ports 23 and 24 are provided in the cylindrical face 21 at the inner ends of the openings 18a and 19a. These cylindrical openings or ports will either function as the inlet or outlet for the valve depending upon the flow of material therethrough.

The cylindrical face 21 defines the seat sealing surfaces for the seats 12 and 13, and is machined to size. These seat surfaces are machined on a radius to the bonnet center line; therefore, single or multiple chuckings on the body without accurate location pads or methods may be employed. Diametrical accuracy of the seat seating surfaces is easier to hold, since they are machined at the same time as the other surfaces. The relation between the seating surfaces and the valve ends becomes independent. Beyond the cylindrical openings or ports 23 and 24, the hub openings are enlarged to facilitate tapping for receiving pipes or conduits of a size that will not necessitate a restriction at the inlet or outlet.

Figure 4:
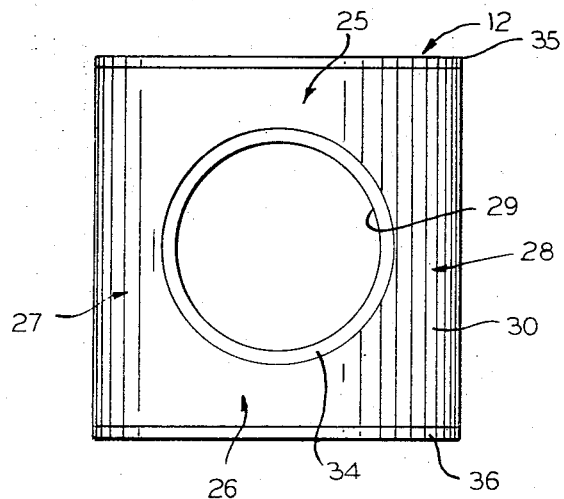
FIG. 4 is an elevational view of the seat according to the invention as removed from the valve and looking at the outer face.
Figure 5:
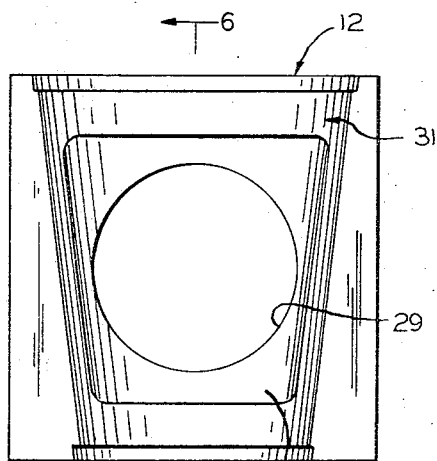
FIG. 5 is an elevational view of the seat looking at the inner face.
Figure 6:
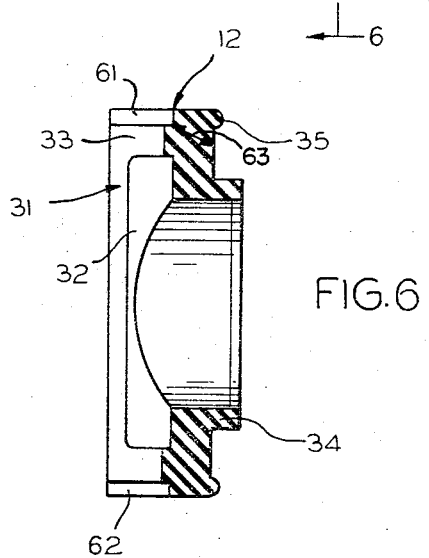
FIG. 6 is a vertical sectional view taken substantially along line 6–6 of FIG. 5.

Since each of the seats 12 and 13 are identical, only one need be described in detail, and accordingly FIGS. 4, 5 and 6 are taken as views of the seat 12. Each seat includes a top wall 25, a bottom wall 26, and opposed side walls 27 and 28 arranged in surrounding relation to an opening or port 29. The top, bottom and opposed side walls include an outer common particylindrical convex face 30, and an inner common partifrustoconical concave face 31. The inner partifrustoconical face 31 includes a recessed area 32 immediately surrounding the opening 29 at one level and a ledge or lip 33 at another level. Sealing relationship with the plug 15 is facilitated by the lip 33. It also permits during final assembly of the valve, predetermined positioning of the plug when first placed between the seats. As the plug is forced downward between the seats, the plug contour forces the seal surfaces of the seats to conform to the plug tapered surface and the cylindrical body inside diameter. Construction of the plug permits the plug to completely deflect the seal surfaces of the seats, allowing a final position against the seat body. The final plug position effects a bubble-tight seal between the plug seats and body by mechanically forcing the elastomeric seat, plug and body to be dimensionally—or geometrically—the same.

A port ring 34 protrudes from the particylindrical face 30 to coact and be telescopically received in the port 23 in the body. While the port ring is illustrated as being cylindrical, as is the seat port 29, it should be appreciated that the ring may have some other geometrical configuration, which would fit in a port of another geometrical configuration. It is important that the port ring matingly and telescopically fit in the body port 23.

The port ring cavities or body ports 23 and 24 are usable as cast, as the alignment of same with the seat seal surface 31 is not critical, due to the deflection of the seat port rings 34, that may be accomplished by mechanical assembly forces. A distorted port ring will still accomplish satisfactory seat positioning.

In order to further facilitate the arrangement of the seats within the cavity of the body, upper and lower supporting lips 35 and 36 are provided on the outer particylindrical face 30 to coact with grooves 37 and 38 formed in the body along the cavity cylindrical wall 21. The grooves 37 and 38 are usable as cast for seat function and machining clearance, wherein the upper groove 37 serves to seat the support lip 35 of the seat 12, while the lower groove 38 at the bottom of the cavity serves to bottom the lip support 36 and provide for tool runout clearance.

The plug 15 of the combination plug and stem 14 is tapered and defined by a frustoconical face 39 that engagingly coacts with the partifrustoconical faces 31 of the seats 12 and 13. A fluid flow passageway or port 40 extends diametrically through the plug 15 for selective intercommunication between the hub openings 18a and 19a and particularly the ports or openings 29 in the seats 12 and 13. In order to allow for longitudinal variations in plug machining and assembly, the plug port 40 is slightly larger than the seat ports 29. The stem and plug are made in one piece and thereafter machined, whereby the stem is in centered alignment axially with the plug. Further, the plug may be completely plated to additionally protect the seal and bearing surface.

The height of the plug is sized so that when in position between the seats it will generally align the passageway or port 40 along the axes of the seat ports 29. The plug is held in place by the cover member 17, which has an opening 41 extending therethrough bearingly receiving a cylindrical boss 42 of the plug that is diametrically reduced from the upper end of the frustoconical face 39. Positioned between the boss 42 and the plug is a diametrically enlarged portion 43 that coacts with the boss to define an annular shoulder 44 that forms a part of an O-ring groove which receives the O-ring 45 for sealing along the stem. This stem O-ring is located within the plug cover thrust bearing surface thereby affording protection of O-ring and sealing surfaces. The other part of the groove is defined by an annular shoulder 46 formed in the cover member 17 below the opening 41 by the vertical face of an annular depending bearing bar 47, the latter of which is in bearing engagement with the upper end wall 48 of the plug 15. This upper end wall is ring-shaped and extends radially to the enlarged portion 43. The lower inner face portion of the bearing bar 47 is shaped to mate with the outer face of the enlarged portion 43. A slight clearance area 49 is provided between the upper plug end wall 47 and the bottom cover wall 50 of the cover member 17 to handle expansion of the seats upon positioning of the plug.

An annular shoulder 51 on the cover member 17 is sized to matingly interfit the open end of the cavity at the bonnet and particularly the cylindrical wall 52, thereby properly orienting the upper end of the combination plug and stem. A recessed annular shoulder 53 is provided below the annular shoulder 51 of the cover member 17 to coact with an annular shoulder 54 formed in the bonnet to define an O-ring groove for containing an O-ring 55 that seals between the cover and the body.

The cover member 17 is held in place by fasteners 56 that coact with bosses 57 on the cover and location ears 58 on the body.

Rotation of the plug is controlled by a plug stem recess 59 cast in the stem 16, which coacts with a stop 60 integrally cast on the cover 17. One end of the plug stem recess is shown at 59a, and the other end is shown at 59a, which ends function as stops. The upper end of the stem 16 is formed to accept a suitable wrench or handle for controlling rotation on the plug.

The geometric construction of the seats 12 and 13 allow form stability thereof to be maintained when under pressure and subjected to mechanical forces from plug rotation, kinetic flow forces, assembly distortion forces, body distortion from line or connection forces, random outside forces against component parts (such as forcing the plug and stem downwardly into the body), buildup of scale between surfaces and seat, residual material stresses in body or plug, and attack from product or diffusion into seat body by gas.

The bottom taper of the plug 15 in engagement against the tapered bottoms of the seats 12 and 13 forms a wedge-shaped section that reacts in a wedging manner from pressure against the bottom. This seat wedging action provides the primary section stability for the lower area of the seats. The support lips 35 and 36 reinforce the top and bottom walls 25 and 26 and aid in holding the overall form of the seat as well as stabilizing the seat against rotation in the body when the plug is rotated. Further, the upper support lip 35 resists distortion of the seat from pressure and mechanical assembly forces. The top wall 25 on the inner surface is recessed at 61 to be below the sealing surface with the plug, in order to minimize distortion of the sealing surface as it is forced into sealing position between the plug and body Similarly, the inner face at the bottom wall 26 is recessed at 62.

As final assembly of the valve is achieved, the support lip 35 is forced into the body cavity groove 37 causing the neck 63 between the sealing surface and the support lip to give tensional support to this section of the seat. Sealing surface deflection is directed mainly in the same direction, thereby increasing the ability of the edges of the support lip to stiffen the form of this section. Construction of the body cavity groove 37 is such that excess seat material is allowed to flow up into the clearance area 49 and not be forced downwardly, which would affect the sealing surface form. The general closeness of the plug and body fit in this section also causes the static friction of the two surfaces to have a larger holding ability than in the bottom section of the seat.

Figure 2:
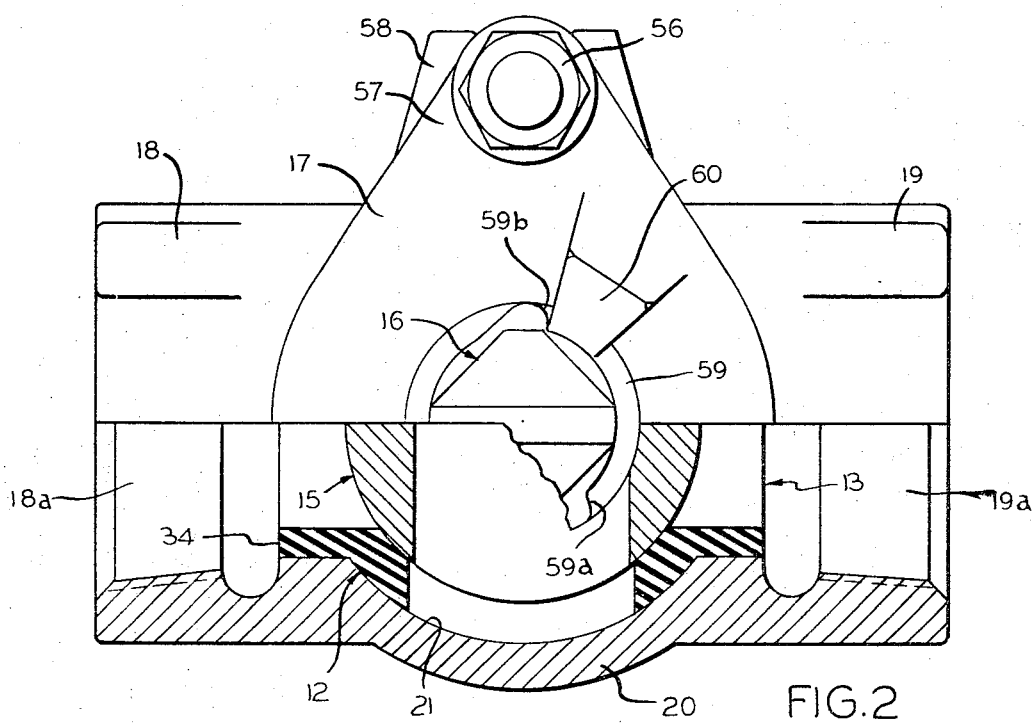
FIG. 2 is a view illustrating one half of the valve of the invention in top plan (the other half in top plan being substantially symmetrically identical), and one half in section as taken substantially along line 2–2 (the other half being symmetrically identical) with certain details omitted for purposes of clarity.
Figure 3:
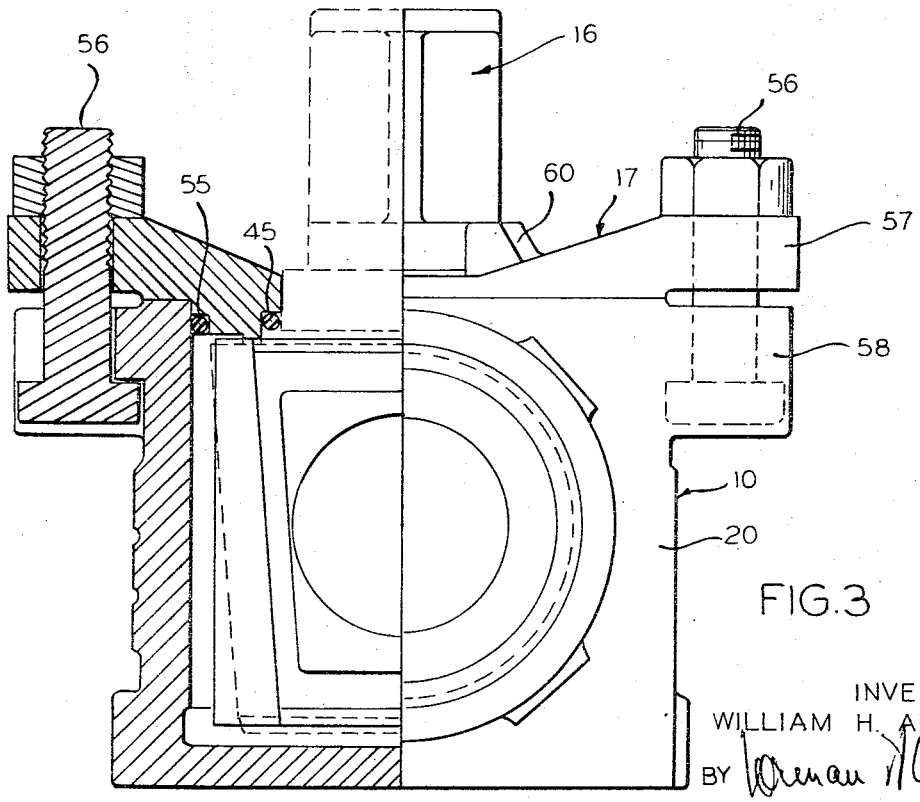
FIG. 3 is a view of the valve illustrating one half in end elevation (the other half being symmetrically identical), and the other half in vertical section as taken substantially along line 3–3 of FIG. 1 (the other half in section being symmetrically identical)

As can be seen particularly in FIG. 2, the areas of the seat in contact with the cavity cylindrical face 21 are larger than those in contact with the plug, causing a component force from the fluid pressure to direct the seat into the body and aid in maintaining seat form. The volume of material in the side walls is greater than at the top wall. Assembly forces are in a direction that do not cause collapse of the seat port inside diameter or cause distortion in that direction. Compression of side wall sealing surfaces cause deflection of the seat outward from the seat port, which deflected volume resists the force of the seat being collapsed into the seat port inside diameter.

The port ring 34 functions as a seat positioning ring for the seat at assembly and during valve operation. The bottom edge of the port ring holds the bottom wall up in position as the plug is forced down between the seats during assembly. The top edge of the port ring reinforces the top wall of the seat, while the side edges locate the seat and hold it in position during opening closing of the valve when frictional and fluid forces tend to move the seat in the body as the plug is rotated. Additionally, the port ring channels the fluid flow through the plug port, and isolates the rear sealing area of the seat from the fluid product when the valve is left in open position. The port ring further holds the seats in the valve body as the valve is assembled or disassembled for maintenance, regardless of the position of the valve.

While the seats may be made of any suitable elastomeric material, and may even consist of a material having a single rigidity factor, it is preferably made of two durometers of the same nitrile compound. Preferably, the face of the seat that seals against the body cavity is approximately 50 duro D-Scale hardness to stiffen the seat form, while the face in engagement with the plug is approximately 70 duro A-Scale hardness. Plug or seat imperfections are bridged or deformed into sealing contact between the surfaces. Seats might also be molded from nitrile-phenolic, one durometer nitrile, one durometer phenolic, Teflon, Delrin, nylon, metal reinforced single durometer material, or other materials and combinations.

The general square shape of the seat, FIGS. 4 and 5, gives the edges of the seat rigidity, as the plug is closed against pressure rolling the edge of the seal by the plug. It also helps hold the edges of the plug seal in position as the final arc of the port pinches off the flow. A lessening of operating torque and an increase of sealing ability will be experienced as the seat compound relaxes.

It will be understood that modifications and variations may be effected without departing from the scope of the novel concepts of the present invention, but it is understood that this application is to be limited only by the scope of the appended claims.

I claim:

1. A plug valve comprising a body, a cavity in said body having a cylindrical wall, coaxially aligned inlet and outlet ports in said body along said cylindrical wall, the axis of said ports being normal to the axis of the cylindrical wall, a pair of identical elastomeric seats one at each port, a tapered plug having a frustoconical face arranged in the cavity and interposed between and engaging said seats, a hole extending diametrically through said plug to control the flow through the valve between the ports, a stem on said plug projecting from the body, each said seat having a rectangular shape as viewed along the axis of said ports and from a centerline extending normal to the axis of and between said ports and including top, bottom and opposed walls surrounding an opening therethrough, said walls having a common outer particylindrical convex face in engagement with the cavity cylindrical wall and a common inner partifrustoconical face in engagement with the plug frustoconical face, and a continuous port ring protruding from said particylindrical face being telescopically matingly received in a port.

2. A plug valve as defined in claim 1, and means on the outer face of each seat coacting with means on the body cylindrical wall for orienting and supporting the seat relative the body.

3. A plug valve as defined in claim 2, wherein said means on each said seat includes a lip projecting from the outer face, and said means on said body including a groove matingly receiving said lip.

4. A plug valve as defined in claim 2, wherein said means on each said seat includes upper and lower lips projecting from the outer face, and said means on said body including upper and lower grooves matingly receiving said upper and lower lips.

5. A plug valve as defined in claim 4, wherein said lips are parallel spaced and normal to the rotational axis of said plug.

6. A plug valve comprising a body core having an inlet port and an outlet port coaxially aligned therewith, a cylindrical cavity in said body core extending normal t the axis of said ports, a pair of identical seats in said cavity one at each of said ports, a tapered plug in said cavity interposed between the seats and having a stem integral therewith and projecting from the body, an opening extending through said plug for selectively intercommunicating the ports, each of said seats having a rectangular shape as viewed along the axis of said ports and from a centerline extending normal to the axis of and between said ports and being of elastomeric material and including top, bottom, and opposed side walls, and a cylindrical port ring surrounded by said walls and matingly received in a port, the walls having an outer common convex particylindrical face engaging the cylindrical cavity about the port and an inner common concave particonical face mating with the plug, whereby the lower wall is thicker than the upper wall and the opposed side walls are progressively thicker from top to bottom.

7. A plug valve as defined in claim 6, and lip means on the seat outer face coacting with groove means on the cylindrical cavity to position and support the seats within the cavity.

8. A plug valve as defined in claim 6, wherein the elastomeric material of the convex face is harder than the elastomeric material of the concave face.

9. A seat of elastomeric material for a plug valve comprising a curvate body having top, bottom and opposed walls surrounding an opening therethrough, said walls having a common outer particylindrical convex face and a common inner partifrustoconical concave face, the outer face adapted to sealingly engage the valve body and the inner face adapted to sealingly engage the plug, and a continuous port ring protruding from the outer face adapted to engage a port in the valve body, said seat having a rectangular shape as viewed from one side along the centerline extending through said port ring.

10. A seat as defined in claim 9, and support lip means on the outer face adapted to coact with groove means in said valve body to support the seat in a predetermined position within the valve body.

11. A seat as defined in claim 10, wherein said support lip means includes a support lip along the top wall and a support lip along the bottom wall.

12. A seat as defined in claim 11, wherein said lips are parallel spaced and extend normal to the rotational axis of a plug.

13. A seat as defined in claim 9, wherein said continuous port ring is in the form of an annulus.

14. A seat as defined in claim 9, wherein the elastomeric material of the convex face is harder than the elastomeric material of the concave face.

15. A plug valve comprising a body including a generally cylindrical wall open at the bonnet end and closed at the other end and defining a cylindrical walled cavity, coaxially aligned and diametrically extending ports in said cylindrical wall defining an outlet and an inlet, a pair of identical elastomeric seats one at each port, each seat having a rectangular shape as viewed along the axis of said ports and from a centerline extending normal to the axis of and between said ports and an outer convex particylindrical face engaging the cylindrically walled cavity and an inner concave partifrustoconical face and an opening aligned with a port, a port ring extending from the convex side about the opening and telescopically received by said port, a tapered plug having a frustoconical face engaging the partifrustoconical faces of said seats, a passageway extending diametrically through said plug for selectively intercommunicating the openings in said seats, a stem extending from said plug, and a cover fitting over said stem and closing the bonnet and holding said plug in proper position relative the seats.